United States Patent [19]

Jones

[11] 4,371,335

[45] Feb. 1, 1983

[54] ZONE SEPARATOR FOR MULTIPLE ZONE VESSELS

[75] Inventor: John B. Jones, Grand Junction, Colo.

[73] Assignee: Paraho Corporation, Grand Junction, Colo.

[21] Appl. No.: 255,163

[22] Filed: Apr. 17, 1981

[51] Int. Cl.³ ............... F27D 1/08; E27B 17/12; B01J 1/00; F24F 9/00
[52] U.S. Cl. .................................. 432/95; 34/168; 422/194; 432/64; 432/215
[58] Field of Search ............... 432/64, 95, 100, 215; 34/168; 422/194, 216

[56] References Cited

U.S. PATENT DOCUMENTS

| | | | |
|---|---|---|---|
| 2,432,872 | 12/1947 | Ferro, Jr. | 585/501 |
| 2,513,995 | 7/1950 | Eastwood et al. | 422/194 |
| 2,552,063 | 5/1951 | Robinson | 432/215 |
| 2,577,655 | 12/1951 | Grossman et al. | 432/27 |
| 2,791,545 | 5/1957 | Kilpatrick | 208/165 |
| 3,488,042 | 1/1970 | Brzozwski et al. | 432/215 |
| 4,116,810 | 9/1978 | Jones et al. | 48/99 |

*Primary Examiner*—John J. Camby
*Attorney, Agent, or Firm*—Finnegan, Henderson, Farabow, Garrett & Dunner

[57] ABSTRACT

A solids-gas contact vessel, having two vertically disposed distinct reaction zones, includes a dynamic seal passing solids from an upper to a lower zone and maintaining a gas seal against the transfer of the separate treating gases from one zone to the other, and including a stream of sealing fluid at the seal.

13 Claims, 7 Drawing Figures

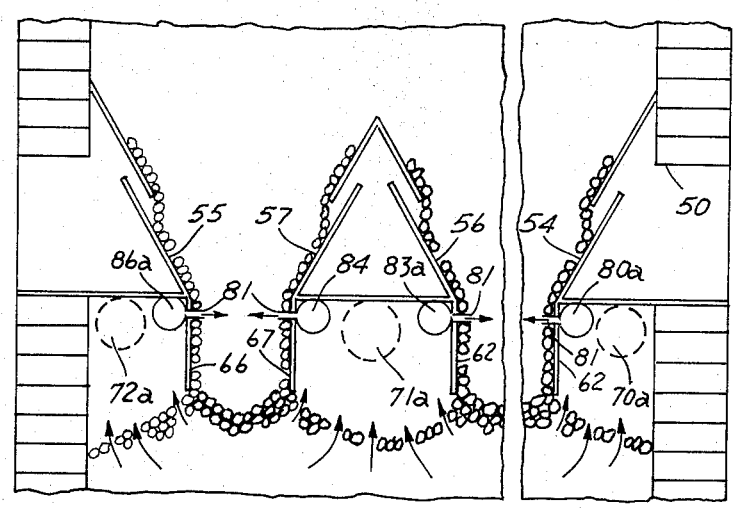
FIG. 4
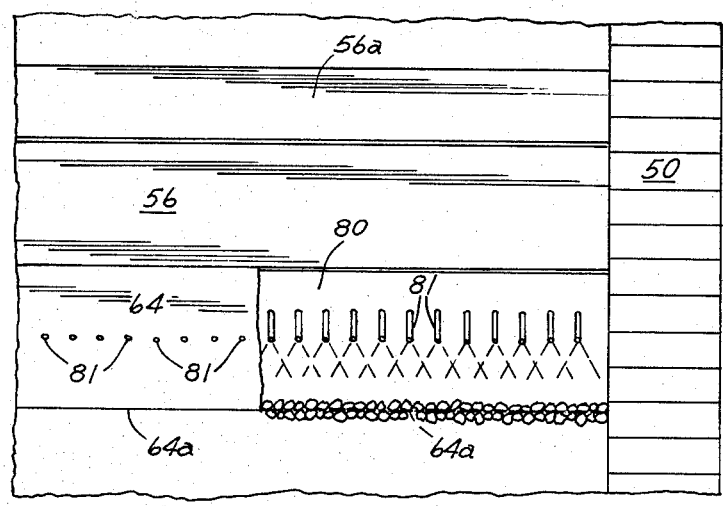
FIG. 5
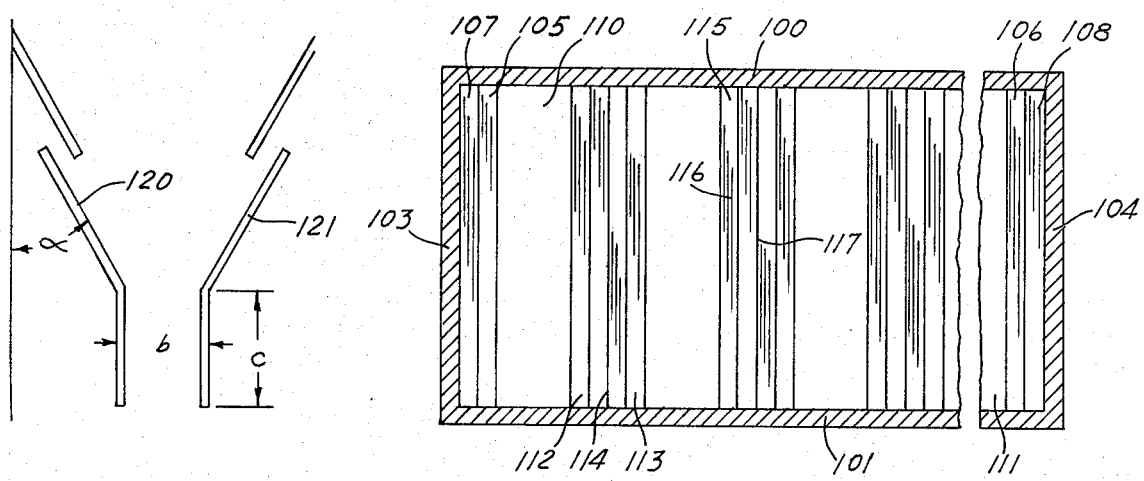
FIG. 7
FIG. 6

ZONE SEPARATOR FOR MULTIPLE ZONE VESSELS

This invention relates to very large reactors in which there are two or more vertically disposed reaction zones, usually solid-gas reactions, and specifically it relates to an improved dynamic seal means between the superposed zones for permitting the passage of solid particulate material from the upper to the lower zone while maintaining separated the gaseous systems in each of the two zones.

PRIOR ART

The treatment of solids with gas, in some instances, requires two different types of reactions, and for continuous processing effectively should be conducted in separate reaction zones and at different times to prevent mixing of the resultant products (gases or liquids) of the two reactions. An example of such a system is the pyrolysis of oil shale. In one pyrolysis treatment, this may include treating oil shale with hot, non-oxygenous gas to pyrolyze the organic material. The pyrolysis produces an oil (normally recovered as a mist of oil droplets) and a hydrocarbon gas (non-condensing under normal conditions). The retorted shale contains residual carbon. Sufficient residual carbon is normally left on the shale, so that when combusted it provides heat which may be used for the pyrolysis or retorting. Normally, this quantity of residual carbon provides the amount of necessary retorting heat, and further provides a recoverable source of energy. In some retorting systems, the residual carbon is not utilized, or it is utilized by combustion in another vessel which is separate from the retort vessel.

Various two reaction systems have been known. Some examples are given below.

In U.S. Pat. No. 2,791,535 to Kilpatrick dated May 7, 1957, a pebble heater is shown where, in essence, 2 vertically disposed vessels are used to provide a heater and a reactor for spherical refractory pebbles for hydrocarbon conversion. The pebbles are contacted by hot combustion gas in the upper of the two vessels, and then heated pebbles are passed to the lower vessel to contact hydrocarbons for their conversion. An elongated, narrow throat joins the lower vessels with the upper vessel. Since the pebbles are spherical with no jagged edges, the single down-comer easily passes the pebbles without jamming. Steam is introduced into the elongated throat, directly onto the pebbles as a blocking gas. The gas from the combustion in the upper vessel passes upward and out of the vessel.

Eastwood et al, U.S. Pat. No. 2,513,995 shows an earlier version of a similar pebbles heater/reactor two vessel system. This system uses an upper combustion vessel connected by an elongated, small diameter throat to the lower vessel. A steam purge is also introduced directly onto the pebbles so jamming is no problem.

A three vessel pebble system is shown in Ferro, Jr. U.S. Pat. No. 2,432,872. This provides a pair of vertically aligned reactors for an initial reaction in the lowest vessel and secondary reaction in the upper (in actuality it is the middle) vessel. The top vessel is a combustion chamber for heating the refractory pebbles passed through the system.

Grossman et al U.S. Pat. No. 2,577,655 shows a three vessel pebble system provided with controls for the three vessels which are connected by a single small throat. The unit is for the production of carbon disulfide.

These units are obviously of small capacity since the vessels are connected in each case by a single circular throat, but which is elongated. Further, the pebbles are defined as small and generally spherical, and devoid of sharp corners or edges which could lock with other similar surfaces or corners of other pieces. The pebbles are defined as preferably from $\frac{1}{4}$ to $\frac{1}{2}$ inch in diameter, or fro $\frac{1}{8}$ to 1 inch. Thus, the solids flow in the single, small cross-section throats is essentially uniform. There is no requirement for a uniform downward flow of the pebbles across the lateral extent of the vessels. The gas in the reactor is being heated by the pebbles. The pebbles are preferably inert adare not treated by the gas.

THE PRESENT INVENTION

The present invention provides for a separator for a large, two zone reaction vessel for particulate material, in which one reaction is conducted in the upper zone and another reaction is conducted in the lower zone. The upper zone is separated from the lower zone by a dynamic seal assembly, which uniformly passes the particulate material but maintains separate the gas in each of the two zones. The seal assembly includes a seal gas so that the gaseous products in the lower zone do not rise and mix with the gas in the upper zone and vice versa. One valuable use of the invention is in the retorting of oil shale on a large scale. Oil shale, when crushed, contains a hydrocarbonaceous solid throughout each particle. Pyrolysis of the shale to produce oil requires heating each shale particle throughout its mass to pyrolyze and vaporize the hydrocarbon material. The heating of the shale by a gas must therefore be essentially uniform in each shale particle for the recovery of the hydrocarbon value of the oil shale. It is improtant that the residence time of the particles in the treatment zone be uniform and the shale must be moved at a uniform rate downwardly through each treatment zone across the lateral extent of the zone. Process gas for each treatment zone is preferably moved upwardly through the particles in each zone. The oil shale particles are preferably in a $\frac{1}{4}$ inch to 3 inch size consist. Such a size range provides voids in the downwardly flowing particulate mass for good passage of the gas without channelling, provided the shale flows uniformly. Feed of raw shale must be uniform across the upper extent of the upper zone, and for large vessels, this may require a plurality of feed inlets to prevent size segregation and maintain a workable bed depth. In a similar manner, the withdrawal of the shale from the lower region of th lower zone throughout the lateral extent of the bed must be from a combined outlet area which prevents bunching, channelling and compacting, and which provides a uniform downward flow of the shale with little lateral mixing of the particles. The seal between the zones must be capable of communicating downward flow from the upper zone to the lower zone when processing the wide size consist material.

The pyrolysis of the raw shale is preferably conducted in the upper zone, since a gravity flow through the vessel is economically feasible. Combustion of the shale is conducted in the lower zone to utilize the energy values of the shale. The shale in the upper zone is retorted wih a hot non-oxygeneous gas which produces a high B.T.U. hydrogen-hydrocarbon gas which must be maintained separate from gases produced by the combustion in the lower zone.

An economical retorting system of oil shale is preferably accomplished on a large scale, with single retort vessels producing some 10,000 barrels of oil a day, or more. This production requres the daily processing of about 14,000–20,000 tons of shale per day in the retort vessel. Such quantities require a large vessel some 60 or more feet in diameter, a 24 feet by 138 feet rectangular vessel, or an equivalent area, with the top of retort assembly some 90 or more feet above ground level. Further, a basic concept in one form of retorting, is that the shale bed in the retort moves downwardly, through the vessel uniformly across its lateral extent. This requires a grate, at the bottom of the vessel, of a cross-sectional area which is a major portion of the cross section of the vessel, to produce the laterally uniform downward movement of the oil shale. The seal between the zones must have openings for rock flow through the seal and should be between 25 and 30 percent of the cross-sectional area of the vessel, to provide for essentially uniform passage of the individual particles through both zones of the vessel. The combined area of the openings in one embodiment of the invention is from 30 to 40 percent of the cross-sectional area of the vessel to provide uniform flow of particulate solids through the seal. Treating gases should be injected uniformly across the lateral extent of the vessel in the two zones.

OBJECTS AND ADVANTAGES OF THE INVENTION

A major object of the invention is to provide a dynamic seal for single, large solid-gas contact vessels having two or more vertically disposed zones, for maintaining the gas in each of the separate zones, whle permitting the solid material to pass from an upper to a lower zone in a uniform flow.

Another object of the invention is to provide a gas seal for a dynamic separator between two vertically disposed zones in a very large solid-gas reaction vessel.

Another object of the invention is to provide a sealing gas in the dynamic seal to separate the gaseous environments in two very large superposed reaction zones in a single vessel, while continuopusly passing solid particulates from the upper zone to the lower zone.

An additional object of the invention is to provide a dynamic seal for a large two zone, vertical vessel for indirect heat retorting of crushed oil shale in the upper zone, and combusting residual carbon on the retorted shale in the lower zone, such seal including crushed shale down-comers arranged to provide for a laterally uniform gravity flow of crushed shale through the upper zone and though the dynamic seal at substantially the same rate, and including gaseous means for sealing the down-comers permitting passage of shale and restricting movement of the gaseous phases between said zones.

These and other objects and advantages of the invention may be ascertained by reference to the following description and appended illustrations.

Still another object of the invention is to provide a dynamic seal for a crushed consist of rock, of wide range of sizes and shape, passing from an upper zone to a lower zone by gravity flow maintaining the laterally uniform flow of the rock through the zones.

GENERAL DESCRIPTION OF THE ILLUSTRATIONS

FIG. 4 is side elevation, cross-section of a portion of the seal for large vessels.

FIG. 5 is a detailed, front elevational view of a portion of a solids down-comer showing the sealing gas distributor system.

FIG. 6 is a top plan view of a dynamic seal in a rectangular vessel.

FIG. 7 is a schematic detail of the arrangement of a dynamic seal of the invention for crushed rock of a wide range of size consist for maintaining laterally uniform flow from an upper to a lower zone.

DETAILED DESCRIPTION OF THE ILLUSTRATIONS

To illustrate the dynamic seal of the invention, an oil shale retort has veen selected. In such a process crushed oil shale (rock) is moved by gravity from an upper zone to a lower zone, maintaining the relative lateral positioning of the rock to prevent segregation and provide uniform treatment of each of the particles of rock. Such a system maintains a uniform residence time of the individual particles in the vessel. The seal of the invention provides for transfer of particles from zone to zone, but maintains the gaseous environment of each zone separate from the other zone.

Figure 1:
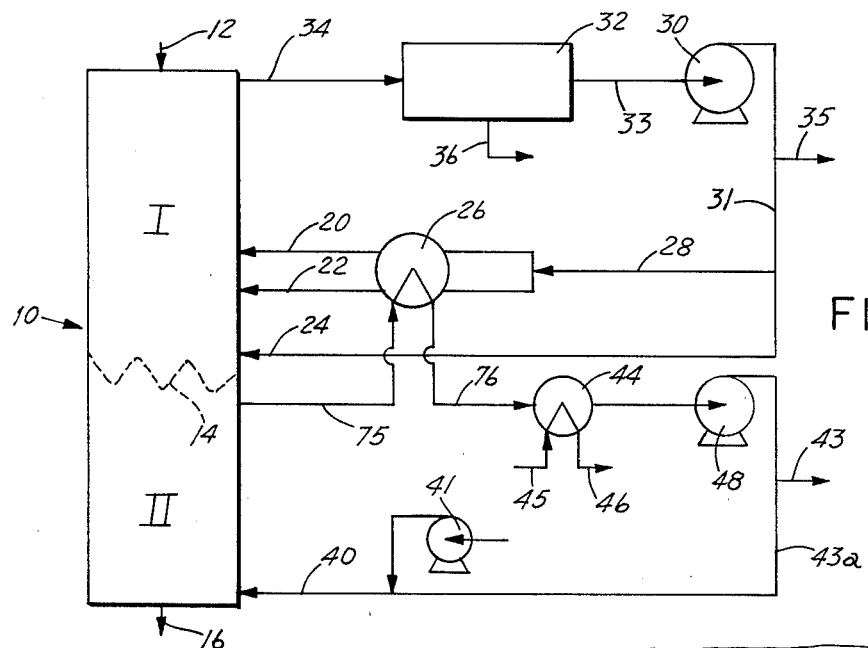
FIG. 1 is a schematic line process flow diagram of an oil shale retort incorporating a single vessel having a lower combustion zone separated from an upper retort zone by a dynamic seal according to the invention.

In the schematic view of FIG. 1, an oil shale processing vessel, shown generally by number 10, is a vertical shaft vessel having an upper raw shale feed 12, a divider-dynamic seal, shown generally by number 14, positioned across the vessel forming an upper zone I and a lower zone II and a spent shale discharge 16. The vessel is essentially an internally open shaft vessel having a metal skin lined with refractory, as the internal temperatures may be in excess of 1400° F. The upper section of the vessel is a retort arranged for indirect heating and pyrolysis of crushed oil shale, as generally described in U.S. Pat. No. 4,116,810 to Jones, Jr. et al dated Sept. 26, 1978 for Indirect Heat Pyrolysis of Oil Shale. This patent describes the process and general arrangement of an indirect heated retort which may be essentially the same as the retort, zone I, of FIG. 1, with the exception that the cooling zone for the present invention passes retorted shale directly from the retort zone through the dynamic seal 14 to a combustor, zone II, with only a slight cooling by the recycle gas injected into the retorted shale through the upper part of the divider 14, described below.

Oil shale for the retort is crushed and screened into a size consist of about ¼ to 3 inches (nominal size). The shale normally breaks into lumps which are generally platelet-like with two larger dimensions and a thin dimension due to the stratified structure. Thus, a 3 inch particle may have a maximum dimension of 6 inches, a smaller dimension of 3 inch and a thin dimension of ¼ inch to 1 inch. Many of the particles are so shaped, with a multiple of sizes, and many are essentially plate-like. Such particles when fed to the retort shale mass assume a random position among the other particles. The particles generally pass down the vessel until an obstruction (something less than the full cross-sectional dimension) is encountered. The obstruction forces the particles to move laterally. This lateral movement provides a limit on the quantity of lateral area obstruction which is acceptable, since too small a cross-sectional area will cause the particles to interlock and bridge the opening.

The retorting zone I includes a two level introduction of externally heated treating gas, including upper level distributor 20 and a middle level distributor 22. These may be in accordance with U.S. Pat. No. 3,589,611 issued Mar. 5, 1969 to Jones, Jr. A lower level distributor 24 introduces a cooled recycle gas through the dynamic seal into the retort zone, as explained below. The heated gas entering the retort through the distributors passes through the distributor lines 20 and 22 after being headted in a heat exchanger 26. Lines 20 and 22 are fed from line 28 obtained from a distributor line 31 from a blower 30. Gas to the blower 30 is received from an oil mist-gas separator 32. The oil/gas separator 32 receives an oil mist and hydrogen-hydrocarbon gas from line 34 from an off-gas collector system in the vessel, similar to the off-gas collector described in U.S. Pat. No. 3,561,927 issued Feb. 9, 1971 to Jones, Jr. The separator 32 removes liquid oil from the off-gas, producing a product oil which is removed by line 36, and a high B.T.U. hydrogen-hydrocarbon gas which passses through product gas line 33 which flows to the blower 30.

The retorting gas is recycled gas from the blower 30, and a portion of this gas is withdrawn through a product gas line 35. The off-gas which is withdrawn from the retort by the off-gas system is at a relatively low temperature, and it may be further cooled by the separator system 32. The gas from the separator is slightly heated by the compression applied by the blower 30. A sufficient quantity of recycle gas for the retorting is heated and injected into the two upper levels by lines 20 and 22 in the shale bed in the vessel. The heated gas provides the heat necessary to pyrolyze all the organic material in the shale which is subject to retorting. Any carbon material which is not vaporized from the shale during the retorting generally remains as organic carbon or coke on the retorted shale. This is the carbon material that is combusted in the combustor zone II below the dynamic seal assembly.

A feed systemfor large retort vessels is shown in U.S. Pat. No. 4,029,220 to Greaves dated June 14, 1977, and this type may be effectively used for feeding a circular vessel. A lower grate mechanism in the bottom of the combustor may be of the general type shown in U.S. Pat. No. 3,401,922 of Sept. 17, 1968 to Jones, Jr. entitled Linear Grate for Shaft Kilns. The feeder and the grate may be combined to uniformly spread the shale across the lateral extent of the shale bed in the vessel, and to cause a uniform gravity flow through both zones. The uniform lateral flow through the vessel provides for a uniform residence time of the oil shale particles in each of the zones in the vessel. The raw shale is fed in a size consist of crushed shale, with fines screened out, for example, one preferred consist of crushed and screened shale is in the range of minus 3 inches to plus ¼ inch. This shale passes through the vessel without attrition, and is removed in the same general size consist.

The retorted shale from the retort zone I of the vessel, passes through the dynamic seal 14 to the combustor zone II where the residual carbon in the shale is stoichiometrically burned with oxygen (either molecular oxygen or air) introduced into the bottom of the combustor zone by line 40. Air from a blower 41 provides air for the combustion, and recycled flue gas from line 43a may be added to the air going into the combustor to quench and control the combustion. Flue gas is released from the system by waste line 43 for disposal. Upon combustion of the carbon, the hot flue gases, both products of combustion and recycled flue gas, are withdrawn from the vessel by line 75 and are passed through the heat exchanger 26. This heats the treating gas for the retort. The flue gas exhaust from the heat exchanger 26 is passed through line 76 to a heat exchanger 44. Water is introduced from water source line 45 to produce a product steam from steam line 46. The steam may be used in the plant, passed to a turbine for production of electricity or sold as an energy product. The spent flue gas from heat exchanger 44 is passed through a blower 48 for exhausting the flue gas to waste or as recycle gas through line 43.

The Dynamic Seal

Figure 2:
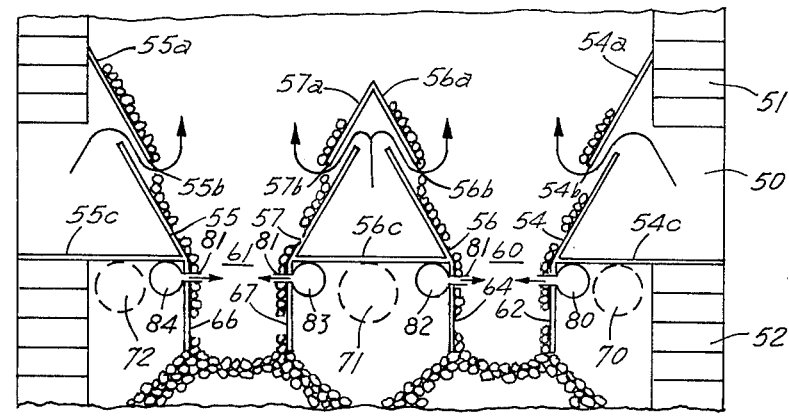
FIG. 2 is a side elevational, cross-section view of one form of a vessel dynamic seal according to the invention.
Figure 3:
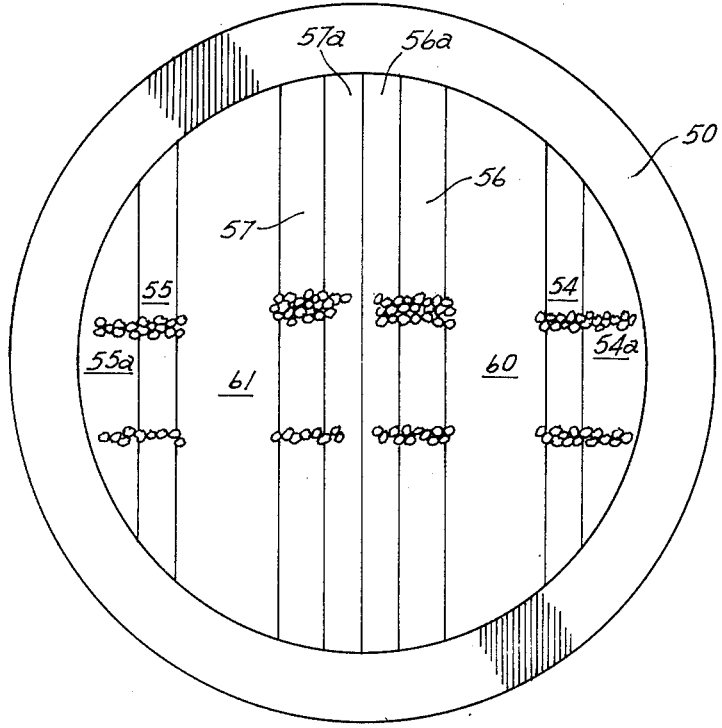
FIG. 3 is a top plan view of a circular vessel with the divider seal of FIG. 1.

The dynamic seal is fromed in the vessel, as a divider between the retort and combustor zones I and II. As illustrated in FIGS. 2-3, a gas distributor channel 50 is built into the wall of the vessel between refractory linings 51 for the retort and 52 for the combustor. This channel may be external of the vessel, as a bustle pipe or internally in the wall of the vessel. The dynamic seal includes, for this particular size vessel, side sloped deflector plates 54 and 55, and a central deflector having sloped side plates 56 and 57. These plates are connected to horizontal bottom plates 54c, 55c and 56c respectively. These plates extend from side to side of the wall of the vessel with openings as the entrance for shale into the generally rectangular down-comer slots 60 and 61. The down-comer slot 60 includes vertical side plates 62 and 64 which extend a short but predetermined distance downwardly from the opening 60. A similar pair of vertical plates 66 and 67 extend downwardly from the opening 61. Side plates 62, 64, 66 and 67 are at least 1.5 times as high as they are wide in one embodiment of the invention; and in another embodiment they are at least 2 times as high as they are wide. Each deflector plate arrangement includes a capping assembly providing a gas injection system into the shale bed at a predetermined rate, along the extent of the gas injector orifice. Plate 54 includes its capping plate 54a leaving a gas injector orifice 54b for entry of gas into the shale bed. Similarly plate 55 includes capping plate 55a with gas injector orifice 55b. A triangular shaped capping plate covers the tops of plates 56 and 57, and this includes plates 56a and 57a with gas injector orifices 56b and 57b, respectively. The recycle gas from the blower 30 is passed through a line 24 to annular distributor 50 and then into the spaces under all the deflector plates including the center deflector assembly for exit through the gas injector orifices 54b, 55b, 56b and 57b. The total volume of gas passing through the gas injector orifices is at least 15 percent of the rate of product gas removed from the upper zone in one embodiment of the invention; and in another embodiment it is 10-15 percent.

The gases of combustion in the combustor are withdrawn from the vessel by means of flue gas collectors 70, 71 and 72 which are connected through a manifold (not shown), to line 75. This withdrawn hot combustion gas passes through the heat exchanger 26. This heats the recycle retort gas for the retorting in the upper retort zone. The flue gas collectors are pipes, around the periphery of the vessel and through the central portion of the vessel, to collect flue gas that passes up through the shale from the combustion zone of the combustor. The hot gas disengages from the shale bed and accumulates in the open spaces (or voids) under the bottom plates 54c, 55c, and 56c. The collectors are connected to the blower 48 by means of the lines 75 and 76, producing a slight negative pressure (in relation to the pressure in the top of the combusted zone) so as to draw the flue gas from the shale - void disengaging surface under each divider seal unit.

An orificed seal gas line 80, 82, 83, 84 is placed in each void under the deflector plates with jets in the side plates of the down-comer in position to pass a curtain of sealing gas in the down-comer throat to blanket the voids in the shale mass in the throat. This prevents the hot flue gas from passing up the down-comers and prevents recycle retort gas from coming down from the retorting zone. For this purpose, seal gas line 80 is provided with a series of closely spaced orifice jets 81 directed through the sidewall plate 62 into down-comers. The jets are spaced completely along the down-comer walls so as to provide a sealing blanket in the voids of the shale mass in the down-comers. Similarly, a pipe 82 with orifices 81 is mounted adjacent wall 64, and pipe 83 with jets 81 is positioned adjacent wall 67. Side deflector plate 66, including a pipe 84, with orifices 81 through the wall, is mounted adjacent the down-comer wall 66 for forming a seal gas blanket in the down-comer. Since the pressure in the combustor is essentially the same as the pressure in the voids below the deflector plates, the flue gas readily flows into the space below the dynamic seal and into the flue gas collectors which are under suction from the blower pulling out the flue gas. The seal gas injected into the down-comers, passes into the shale effectively blocking the flow of flue gas up the down-comer or the recycle gas from blowing downwardly as the pressure in the bottom of the retort zone is essentially at a pressure which is slightly lower than the pressure in the top of the combustor. Some of the sealing gas will therefore be drawn into the retort zone, however, it is relatively small (less than about 15% of the total quantity of sealing gas) and has little effect on retort operation. The seal gas (which is non-combustible) in the down-comers, also, quenches any tendency of combustion of accidently mixed flue gas and hydrocarbon gas.

In an indirect heated oil shale retorting process, raw shale (crushed) enters the retort at ambient temperatures and is heated by the rising retorting gases and retort products. The condensable matter is generally condensed by the cooler incoming shale forming minute droplets as a mist, airborne in the non-condensable gas. In one example, raw shale enters at about 70° F., while the gas flow rate, entering the two distributors 20 and 22, conditioned with the gas introduced from the dynamic seal from line 24 (usually about 250° F.), is adjusted to provide an off-gas temperature of about 140° F. from the top of the vessel out line 34. The incoming shale is progressively heated by rising gas through the two levels of heated gas injection to about 950° F. Following this heating, during which the shale is retorted, the shale is cooled somewhat by the lower recycle gas entering the shale bed through the divider-seal from line 24. This cooling aids in retention of the heat inventory in the retort zone, by heating the additional gas added to the bottom of the retort zone and cooling surface shale particles somewhat before they enter the seal. The temperature gradient in the particle favors the removal of residual oil vapors and gas within the particles. The cooling may be sufficient to cool the shale to about 700°–800° F.

The partly cooled retorted shale passes through dynamic seal 14 into the combustion zone. On passing through the down-comers the cooler shale somewhat cools the gases rising from the lower combustion zone. The bottom injected incoming air and tempering flue gas (cooled by passage through the heat exchangers) cools the spent shale from the combustion zone to about 350° F. or lower for disposal. This rising air and flue gas is therefore, progressively heated, and on entering the combustion zone is maintained in a relatively narrow zone, which is necessary to burn all the carbon. The bottom flue gas acts to quench and control the combustion maintaining about 1400° F., and holding any possible endothermic reactions to a minimum. This is desirable since such endothermic reactions require heat. The air-flue gas injected into the bottom of the combustor picks up heat from the combusted shale as it flows toward the shale outlet, aiding the maintenance of the heat inventory in the combustor, increasing the overall thermal efficiency. The flow rates of air-flue gas are maintained at a rate to establish a combustion zone which is well below the dynamic seal, so as to prevent flames from the high rate oxidation from entering the voids below the seal and possibly going up through the seal into the retort full of combustible gases. By proper design of the heat exchangers (and economizers on the flue gas exhaust to preheat water to heat exchanger 44) steam at over 900° F. is generated. This is sufficient for control steam for the plant, for example as a seal gas in the dynamic seals, and any excess is an energy by-product from the plant.

A major consideration of retort operation is the flow of the crushed shale through the vessel. While the spherical pebble heater-reactors of the prior art can utilize a single small circular throat between the two zones, the necessary flow pattern and shale shape characteristics in the present invention precludes the use of a single connecting throat between superposed zones in a single vessel. The shale is the feed ingredient that contains the values of the process, and the shale particles must be treated so as to heat them completely through for effective retorting. This is achieved by the uniform flow across the lateral extent of the vessel. The crushed shale is broken shale having indiscriminate form with multiple edges, corners, flat surfaces, (various particle shape factors) etc. which can bind and cause blockages, if attempts are made to move the shale mass from a large cross-sectional area into a small cross-section down-comer. A divider/seal with relatively large openings is necessary to communicate from the upper to the lower zones maintaining the uniform shale flow from the upper zone through the seal to the lower zone. The openings, however, must be small enough to maintain the gas atmospheres of the two zones separate and to hold the sealing gas barrier. The openings should be restrictive to solids only in one direction (laterally not longitudinally of the openings). Thus particles which may tend to bridge across the opening must have freedom to move laterally, changing positioning and thus eliminating the potential for bridging.

A divider/seal discussed above is for a circular or essentially circular vessel. The divider/seal is highly useful for other shapes of vessels. For example, a rectangular vessel may use the divider/seal as shown in FIG. 6. The vessel includes parallel sides 100 and 101 and end walls 103 and 104, supported, of course, by an appropriate structural means. The walls include a refractory material since it is in essence a furnace. The length and width are determined by the desired capacity of shale and the material of construction for a feasible design. One size may be 24 feet wide by 138 feet long, for a particular production rate. For this arrangement, wall deflector plates 105 and 106 with cap plates 107 and 108 respectively, provide for deflecting shale into down-comer openings 110 and 111 respectively. Adjacent to down-comer throat 110 is a deflector assembly comprising plates 112 and 113 with a triangular cap assembly 114, similar to that described for FIG. 2. An adjacent assembly of similar shape includes plates 115 and 116 with triangular cap 117. Similarly deflectory assemblies extend along the length of the retort.

The character of the shale requires deflector walls which are substantially steeper than the angle of repose of shale. As shown in the detail of FIG. 7, the slope of a deflector wall 120 is at an angle. This angle has been determined to be from 55° to 65° for Colorado shale at a size consist of from minus 3 inch to plus ¼ inch. The throat openings width has been determined to range from 4 to 6 times the maximum particle dimension. For shale with a maximum dimension of 3 inches, the throat opening b is 12 to 18 inches wide. The sloped deflector plates realign the particles for passage through the throat. Thus, if the particles are generally horizontally aligned, i.e., platelets stacked in a generally horizontal arrangement, the deflector plates tip the particles for smooth passage through the throat. It is to be noted that each down-comer slot provides a release for shale in the general volume bounded by imaginary lines extending vertically from the ridge of each deflector cap (the walls provide the boundary at each end and each side). The depth of the down-comer walls must be sufficient to form an effective seal gas curtain. The shale forms a trough under each deflector assembly, with walls (of shale) at the angle of repose of the shale. This provides a disengaging surface for the flue gas which is greater than the horizontal cross-sectional area between the bottom edges of the side wall plates of the down-comers. In one embodiment of the invention, this disengaging surface of the solid particulates has an area of from 60 to 70 percent of the cross section dimensions of the vessel. Further, the down-comers are full of shale and the jetted sealing gas is introduced at a velocity to extend at least halfway across the throat to join the jetted steam from the other wall forming the barrier blanket. The seal gas may be an inert gas or may be steam. For oil shale, steam is useful in that it reacts with some of the hot carbon on shale in a water shift reaction, producing some hydrogen and carbon monoxide, etc. By proper control of the process the difference in pressures in the upper and lower zones is quite small, reducing the volume of seal gas necessary to form an effective seal. With oil shale and a pressure difference of less than 1 psi between the zones, about 2.2 mols of steam per ton of shale will effectively seal the divider/seal between the zones.

What is claimed is:

1. Apparatus for treating non-uniformly sized and shaped particulate solid material, comprising:
   (a) a substantially vertically extending hollow vessel having upper and lower zones, wherein the particulate material is fed into the upper zone of the vessel and treated particulate material is withdrawn from the lower zone of the vessel, said zones having dissimilar gaseous atmospheres passing therethrough, and wherein the particulate material descends under the force of gravity through the upper zone and then the lower zone; and
   (b) zone separator means situated within said vessel between said upper and lower zones for passing said particulate material from the upper zone to the lower zone on a uniform basis across the lateral extent of said vessel while simultaneously preventing the passage of said gaseous atmospheres through said zone separator means from one zone to the other, said zone separator means having a plurality of down-comer throats for permitting uniform downward flow of said material therethrough and a plurality of barrier means adjacent to said down-comer throats for preventing passage of said material and said gaseous atmospheres therethrough and for directing said material toward said down-comer throats, each of said barrier means including at least one sloped wall extending upwardly and away from the top of one of said down-comer throats at an angle above the horizontal plane greater than the repose angle of said particulate solid material in said vessel, each of said down-comer throats having a minimum lateral dimension of from about 4 to about 6 times the maximum dimension of the largest particle of said solid material to be treated, the combined minimum lateral cross-sectional area of said plurality of down-comer throats lying within the range of from about 30 percent to about 40 percent of the lateral cross-sectional area of said vessel at the location of said zone separator means, said down-comer throats having downwardly extending side walls for directing said solid particulate material, each of said side walls having a vertical length equal to at least the minimum lateral cross-sectional dimension of said down-comer throat, said side walls forming gas collecting spaces therebetween for collecting gases which disengage from the upper surface of the bed of particulate solid material in said lower zone, said zone separator means further including seal gas injection means in fluid communication with said down-comer throats for injecting a sealing curtain of gas therein for maintaining the separation of the gaseous atmospheres in said upper and lower zones of the vessel while simultaneously permitting uniform downward flow of said particulate material through said down-comer throats.

2. In the treatment apparatus of claim 1, wherein the vessel is essentially circular and said down-comer throats extend generally parallel to each other across said zone separator means.

3. In the treatment apparatus of claim 1, wherein gas injectors are provided in said sloped walls for injecting gas into the bottom of the upper zone.

4. The treatment apparatus of claim 3, wherein said gas injectors include a plurality of orifices uniformly arranged in said sloped walls so as to provide uniform gas-solids contacting in the lower portion of the upper zone above said zone separator means.

5. In the treatment apparatus of claim 4, wherein a portion of the gas in the upper zone is continually removed and the gas injectors are adapted to inject a combined volume of at least 15 percent of the rate of gas removal from the upper zone.

6. In the treatment apparatus of claim 4, wherein a portion of the gas in the upper zone is continually removed and the gas injectors are adapted to inject a combined volume of 10–15 percent of the rate of gas removal from the upper zone.

7. In the treatment apparatus of claim 1, wherein said angle of said sloped walls is 55–65 degrees.

8. In the treatment apparatus of claim 1, wherein said seal gas injection means includes a plurality of gas jets directed through said down-comer throat sidewalls.

9. In the treatment apparatus of claim 8, wherein said gas jets include orifices placed in systematic arrangement in both sidewalls of each down-comer throat to provide uniform seal gas distribution through said down-comer throats.

10. In the treatment apparatus of claim 1, wherein the down-comer throat sidewalls are at least 1½ times as high as they are wide.

11. In the treatment apparatus of claim 1, wherein the down-comer throat sidewalls are at least 2 times as high as they are wide.

12. Apparatus for treating non-uniformly sized and shaped particulate solid material, comprising:
  (a) a substantially vertically extending hollow vessel having upper and lower zones, wherein the particulate material is fed into the upper zone of the vessel and treated particulate material is withdrawn from the lower zone of the vessel, said zones having dissimilar gaseous atmospheres passing therethrough, and wherein the particulate material descends under the force of gravity through the upper zone and then the lower zone; and
  (b) zone separator means situated within said vessel between said upper and lower zones for passing said particulate material from the upper zone to the lower zone on a uniform basis across the lateral extent of said vessel while simultaneously preventing the passage of said gaseous atmospheres through said zone separator means from one zone to the other, said zone separator means having a plurality of down-comer throats for permitting uniform downward flow of said material therethrough and a plurality of barrier means adjacent to said down-comer throats for preventing passage of said material and said gaseous atmospheres therethrough and for directing said material toward said down-comer throats, each of said barrier means including at least one sloped wall extending upwardly and away from the top of one of said down-comer throats at an angle above the horizontal plane greater than the repose angle of said particulate solid material in said vessel, each of said down-comer throats being substantially rectangular in shape, when viewed from above, the longer dimension being essentially equal to the width of the vessel at the location of said throat, and each of said down-comer throats having a minimum lateral dimension of from about 4 to about 6 times the maximum dimension of the largest particle of said solid material to be treated, the combined minimum lateral cross-sectional area of said plurality of down-comer throats lying within the range of from about 30 percent to about 40 percent of the lateral cross-sectional area of said vessel at the location of said zone separator means, said down-comer throats having downwardly extending side walls for directing said solid particulate material, each of said side walls having a vertical length equal to at least the minimum lateral cross-sectional dimension of said down-comer throat, said side walls forming gas collecting spaces therebetween for collecting gases which disengage from the upper surface of the bed of particulate solid material in said lower zone, said zone separator means further including seal gas injection means in fluid communication with said down-comer throats for injecting a sealing curtain of gas therein for maintaining the separation of the gaseous atmospheres in said upper and lower zones of the vessel while simultaneously permitting uniform downward flow of said particulate material through said down-comer throats.

13. Apparatus as claimed in claim 1 or 12, wherein the side walls of said down-comer throats are adapted to direct the particulate solid material exiting from said throats so as to form an upper surface area of the bed of material in said lower zone of from 60 to 70 percent of the lateral cross-sectional area of said vessel at the location of said down-comer throat exits.

* * * * *